(12) United States Patent
Shen

(10) Patent No.: US 12,699,731 B2
(45) Date of Patent: Aug. 4, 2026

(54) SEARCH RESULT DISPLAY METHOD AND APPARATUS, AND COMPUTER DEVICE AND STORAGE MEDIUM

(71) Applicant: Douyin Vision (Beijing) Co., Ltd., Beijing (CN)

(72) Inventor: Chuwen Shen, Beijing (CN)

(73) Assignee: Douyin Vision (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/834,905

(22) PCT Filed: May 10, 2023

(86) PCT No.: PCT/CN2023/093166
§ 371 (c)(1),
(2) Date: Jul. 31, 2024

(87) PCT Pub. No.: WO2023/236710
PCT Pub. Date: Dec. 14, 2023

(65) Prior Publication Data
US 2025/0110988 A1 Apr. 3, 2025

(30) Foreign Application Priority Data
Jun. 7, 2022 (CN) .......................... 202210634752.8

(51) Int. Cl.
*G06F 16/00* (2019.01)
*G06F 16/738* (2019.01)
*G06F 16/783* (2019.01)

(52) U.S. Cl.
CPC ........ *G06F 16/739* (2019.01); *G06F 16/7844* (2019.01)

(58) Field of Classification Search
CPC .......................... G06F 16/739; G06F 16/7844
See application file for complete search history.

(56) References Cited

U.S. PATENT DOCUMENTS

2008/0154889 A1* 6/2008 Pfeiffer ................. G06F 16/738
707/999.005
2014/0289226 A1* 9/2014 English ............... G06F 16/9538
707/722
(Continued)

FOREIGN PATENT DOCUMENTS

CN 108984098 A 12/2018
CN 109561339 A 4/2019
(Continued)

OTHER PUBLICATIONS

First Office Action for Chinese Application No. 202210634752.8, mailed Mar. 17, 2025, 19 pages.
(Continued)

*Primary Examiner* — Syed H Hasan

(57) ABSTRACT
Provided in the present disclosure are a search result display method and apparatus, and a computer device and a storage medium. The method includes: in response to a search request, acquiring a preview resource of a target video, which is associated with search information in the search request, wherein the preview resource includes a first associated text, an attribute type corresponding to the first associated text and video preview information of the target video, and the first associated text is extracted on the basis of the target video; and on the basis of a search result display form corresponding to the attribute type, displaying the video preview information of the target video and a second associated text, wherein the second associated text at least includes some content of the first associated text.

16 Claims, 6 Drawing Sheets

(56)  References Cited

U.S. PATENT DOCUMENTS

| | | | |
|---|---|---|---|
| 2017/0293618 A1* | 10/2017 | Gorrepati | G06F 40/169 |
| 2022/0208016 A1* | 6/2022 | Le Chevalier | G06F 3/011 |
| 2023/0077037 A1* | 3/2023 | Zimmerman | G10L 15/01 |

FOREIGN PATENT DOCUMENTS

| | | | |
|---|---|---|---|
| CN | 111538851 | A | 8/2020 |
| CN | 111586492 | A | 8/2020 |
| CN | 112423138 | A | 2/2021 |
| CN | 112541109 | A | 3/2021 |
| CN | 113779307 | A | 12/2021 |
| CN | 113965792 | A | 1/2022 |
| CN | 114297433 | A | 4/2022 |
| CN | 114297440 | A | 4/2022 |
| CN | 114372160 | A | 4/2022 |
| CN | 114969433 | A | 8/2022 |
| JP | 2019-186843 | A | 10/2019 |

OTHER PUBLICATIONS

International Search Report and Written Opinion received for PCT Patent Application No. PCT/CN2023/093166, mailed on Aug. 7, 2023, 12 pages (2 pages of English Translation and 10 pages of Original Document).

* cited by examiner

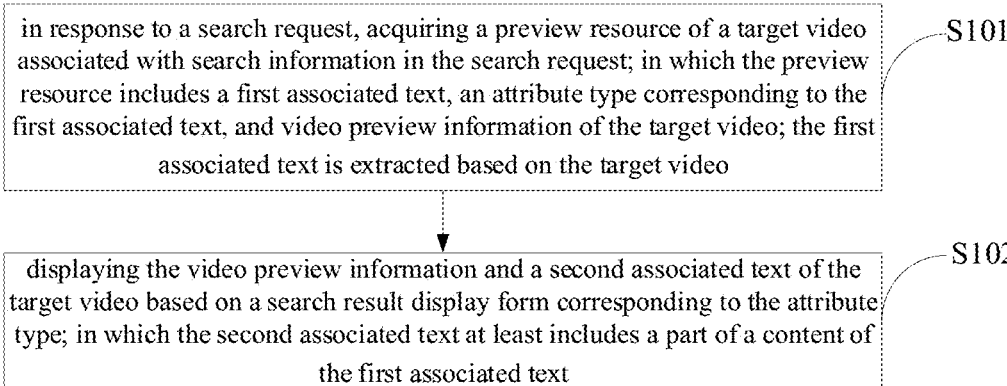

in response to a search request, acquiring a preview resource of a target video associated with search information in the search request; in which the preview resource includes a first associated text, an attribute type corresponding to the first associated text, and video preview information of the target video; the first associated text is extracted based on the target video — S101 displaying the video preview information and a second associated text of the target video based on a search result display form corresponding to the attribute type; in which the second associated text at least includes a part of a content of the first associated text — S102

Fig. 1

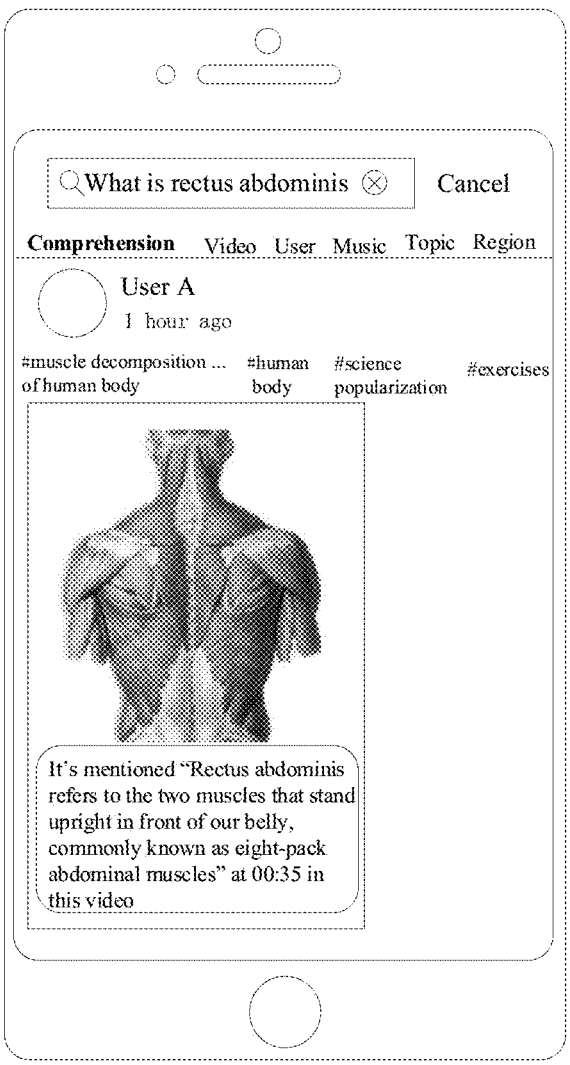

What is rectus abdominis ⊗    Cancel

Comprehension   Video  User  Music  Topic  Region

User A
1 hour ago muscle decomposition ...    #human    #science           #exercises
of human body              body      popularization It's mentioned "Rectus abdominis refers to the two muscles that stand upright in front of our belly, commonly known as eight-pack abdominal muscles" at 00:35 in this video

Fig. 2a

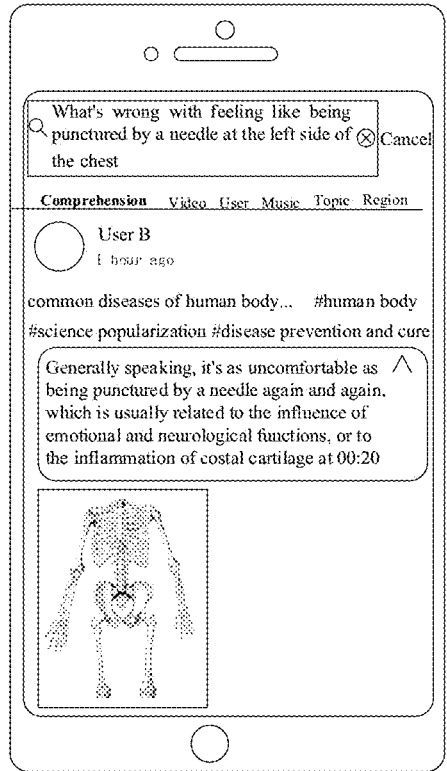

What's wrong with feeling like being punctured by a needle at the left side of ⊗ Cancel the chest

Comprehension   Video   User   Music   Topic   Region

User B
1 hour ago common diseases of human body...　#human body
science popularization #disease prevention and cure Generally speaking, it's as uncomfortable as ∧
being punctured by a needle again and again,
which is usually related to the influence of
emotional and neurological functions, or to
the inflammation of costal cartilage at 00:20

Fig. 2d

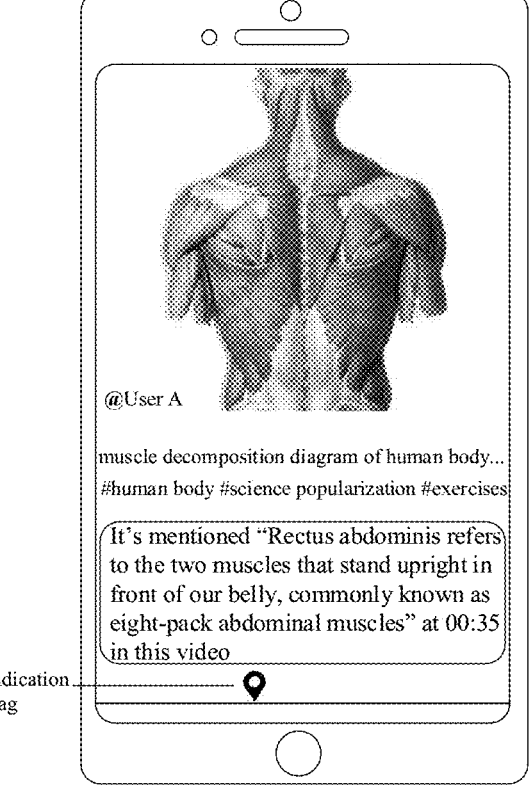

@User A muscle decomposition diagram of human body...
human body #science popularization #exercises It's mentioned "Rectus abdominis refers
to the two muscles that stand upright in
front of our belly, commonly known as
eight-pack abdominal muscles" at 00:35
in this video Indication
Tag

Fig. 3a

SEARCH RESULT DISPLAY METHOD AND APPARATUS, AND COMPUTER DEVICE AND STORAGE MEDIUM

The present application is a national phase application of International Patent Application No. PCT/CN2023/093166, filed on May 10, 2023, which claims the priority of Chinese patent application No. 202210634752.8 filed on Jun. 7, 2022, and the disclosure of the above-mentioned Chinese patent application is hereby incorporated in its entirety as a part of the present application.

TECHNICAL FIELD

Embodiments of the present disclosure relate to a search result display method and apparatus, a computer device, and a storage medium.

BACKGROUND

In a search scene, after searching with search information, search results containing videos can be acquired.

For video type search results, users usually need to watch the video before they can acquire the content related to the search information from the video. Therefore, for such video type search results, it takes a longer time for the users to acquire the related content, which results in poor efficiency.

SUMMARY

Embodiments of the present disclosure at least provide a search result display method and apparatus, a computer device, and a storage medium.

In a first aspect, the embodiments of the present disclosure provide a search result display method, which includes: in response to a search request, acquire a preview resource of a target video associated with search information in the search request; in which the preview resource includes a first associated text, an attribute type corresponding to the first associated text, and video preview information of the target video; the first associated text is extracted based on the target video; and display the video preview information and a second associated text of the target video based on a search result display form corresponding to the attribute type; in which the second associated text at least includes a part of a content of the first associated text.

In an alternative implementation, the attribute type of the first associated text is determined by: in response to the search information being of a non-question-and-answer search type, determining that the first associated text belongs to a summary attribute type; in response to the search information being of a question-and-answer search type, determining that the first associated text belongs to an answer attribute type in response to the first associated text containing answer information corresponding to the search information, and determining that the first associated text belongs to the summary attribute type in response to the first associated text not containing the answer information corresponding to the search information; determining the second associated text by: in response to the first associated text belonging to the summary attribute type, taking the first associated text as the second associated text; in response to the first associated text belonging to the answer attribute type, determining the second associated text corresponding to the first associated text based on an answer type of the first associated text.

In an alternative implementation, in response to the first associated text belonging to the answer attribute type, the answer type of the first associated text includes a first answer type and a second answer type; the second associated text is determined by: in response to the answer type corresponding to the first associated text being the first answer type, taking the first associated text as the second associated text; in response to the answer type corresponding to the first associated text being the second answer type, selecting a keyword matching the search information from the first associated text, and generating the second associated text based on the keyword.

In an alternative implementation, in response to the first associated text belonging to the answer attribute type, the answer type corresponding to the first associated text is determined by: determining that the answer type corresponding to the first associated text is the first answer type in response to the first associated text satisfying a classification condition of the first answer type, and determining that the answer type corresponding to the first associated text is the second answer type in response to the first associated text not satisfying the classification condition of the first answer type; the classification condition of the first answer type includes at least one of: a statistical word number of the first associated text being less than a preset answer word number threshold, the keyword associated with the search information in the first associated text being used as a leading word of the first associated text, and only one piece of answer information matching a search word being contained in the first associated text.

In an alternative implementation, displaying the video preview information and the second associated text of the target video based on the search result display form corresponding to the attribute type, includes: in response to the attribute type being a first answer type under an answer attribute type, displaying the second associated text on the video preview information; in response to the attribute type being a summary attribute type or a second answer type under the answer attribute type, displaying the second associated text in a location region adjacent to the video preview information.

In an alternative implementation, the method further includes: in response to a display triggering operation on the video preview information, displaying a full-screen playback page of a content corresponding to the video preview information; displaying the second associated text, in a form of a floating layer, on the full-screen playback page; and in response to the attribute type being a second answer type under the answer attribute type, updating the second associated text to the first associated text in response to triggering the second associated text.

In an alternative implementation, the method further includes: in response to a display triggering operation on the second associated text, updating the second associated text to the first associated text.

In an alternative implementation, determining the second associated text based on the keyword, includes: splicing a plurality of selected keywords based on a semantic order of the plurality of selected keywords in the first associated text to obtain the second associated text.

In an alternative implementation, the video preview information is associated with at least one indication tag; each of the at least one indication tag is configured to indicate a corresponding playback position, in the target video, of at least part of text information of the second associated text; displaying the video preview information of the target video, includes: determining a display position corresponding to each of the at least one indication tag according to at least one playback position, in the target video, corresponding to the second associated text; displaying the video preview information, and displaying the at least one indication tag on the video preview information based on the display position determined for each of the at least one indication tag.

In an alternative implementation, determining the display position corresponding to each of the at least one indication tag according to at least one playback position, in the target video, corresponding to the second associated text, includes: determining the display position of the at least one indication tag from progress positions indicated by a playback progress bar of the target video according to the at least one playback position, in the target video, corresponding to the second associated text; and/or, determining the display position of the indication tag at the display position in the second associated text, according to text information corresponding to each of the at least one playback position.

In an alternative implementation, the method further includes: in response to a triggering operation for any of the at least one indication tag, determining the playback position indicated by the indication tag as an initial playback position of the target video; and playing the target video from the initial playback position.

In a second aspect, the embodiments of the present disclosure provide a search result display apparatus, which includes: an acquisition module, configured to acquire a preview resource of a target video associated with search information in a search request in response to the search request; in which the preview resource includes a first associated text, an attribute type corresponding to the first associated text, and video preview information of the target video; the first associated text is extracted based on the target video; and a display module, configured to display the video preview information and a second associated text of the target video based on a search result display form corresponding to the attribute type; in which the second associated text at least includes a part of a content of the first associated text.

In an alternative implementation, the attribute type of the first associated text is determined according to the following ways: in response to the search information being of a non-question-and-answer search type, determining that the first associated text belongs to a summary attribute type; in response to the search information being of a question-and-answer search type, determining that the first associated text belongs to an answer attribute type in response to the first associated text containing answer information corresponding to the search information, and determining that the first associated text belongs to the summary attribute type in response to the first associated text not containing the answer information corresponding to the search information. The second associated text is determined according to the following ways: in response to the first associated text belonging to the summary attribute type, taking the first associated text as the second associated text; in response to the first associated text belonging to the answer attribute type, determining the second associated text corresponding to the first associated text based on an answer type of the first associated text.

In an alternative implementation, in response to the first associated text belonging to the answer attribute type, the answer type of the first associated text includes a first answer type and a second answer type; the second associated text is determined according to the following ways: in response to the answer type corresponding to the first associated text being the first answer type, taking the first associated text as the second associated text; in response to the answer type corresponding to the first associated text being the second answer type, selecting a keyword matching the search information from the first associated text, and generating the second associated text based on the keyword.

In an alternative implementation, in response to the first associated text belonging to the answer attribute type, the answer type corresponding to the first associated text is determined by the following ways: determining that the answer type corresponding to the first associated text is the first answer type in response to the first associated text satisfying a classification condition of the first answer type, and determining that the answer type corresponding to the first associated text is the second answer type in response to the first associated text not satisfying the classification condition of the first answer type. The classification condition of the first answer type includes at least one of the following: a statistical word number of the first associated text being less than a preset answer word number threshold, the keyword associated with the search information in the first associated text being used as a leading word of the first associated text, and only one piece of answer information matching a search word being contained in the first associated text.

In an alternative implementation, in response to displaying the video preview information and the second associated text of the target video based on the search result display form corresponding to the attribute type, the display module is configured to: in response to the attribute type being a first answer type under an answer attribute type, display the second associated text on the video preview information; in response to the attribute type being a summary attribute type or a second answer type under the answer attribute type, display the second associated text in a location region adjacent to the video preview information.

In an alternative implementation, the search result display apparatus further includes a first processing module, which is configured to: in response to a display triggering operation on the video preview information, display a full-screen playback page of a content corresponding to the video preview information; display the second associated text, in a form of a floating layer, on the full-screen playback page; and in response to the attribute type being a second answer type under the answer attribute type, update the second associated text to the first associated text in response to triggering the second associated text.

In an alternative implementation, the search result display apparatus further includes a second processing module, which is configured to: in response to a display triggering operation on the second associated text, update the second associated text to the first associated text.

In an alternative implementation, in response to determining the second associated text based on the keyword, it may include: splicing a plurality of selected keywords based on a semantic order of the plurality of selected keywords in the first associated text to obtain the second associated text.

In an alternative implementation, the video preview information is associated with at least one indication tag; each of the at least one indication tag is configured to indicate a corresponding playback position, in the target video, of at least part of text information of the second associated text; in response to displaying the video preview information of the target video, the display module is configured to: determine a display position corresponding to each of the at least one indication tag according to at least one playback position, in the target video, corresponding to the second associated text; display the video preview information, and display the at least one indication tag on the video preview information based on the display position determined for each of the at least one indication tag.

In an alternative implementation, in response to determining the display position corresponding to each of the at least one indication tag according to at least one playback position, in the target video, corresponding to the second associated text, the display module is configured to: determine the display position of the at least one indication tag from progress positions indicated by a playback progress bar of the target video according to the at least one playback position, in the target video, corresponding to the second associated text; and/or, determine the display position of the indication tag at the display position in the second associated text, according to text information corresponding to each of the at least one playback position.

In an alternative implementation, the display module is further configured to: in response to a triggering operation for any of the at least one indication tag, determine the playback position indicated by the indication tag as an initial playback position of the target video; and play the target video from the initial playback position.

In a third aspect, the embodiments of the present disclosure provide a computer device, which includes a processor and a memory, the memory stores machine-readable instructions executable by the processor, and the processor is configured to execute the machine-readable instructions stored in the memory, and in response to the machine-readable instructions being executed by the processor, the processor performs the steps in the first aspect or any possible implementation of the first aspect.

In a fourth aspect, the embodiments of the present disclosure provide a computer-readable storage medium, on which a computer program is stored, in response to the computer program being executed, the steps in the first aspect or any possible implementation of the first aspect is performed.

For the description of the effect of the above search result display apparatus, computer device and computer-readable storage medium, please refer to the description of the above search result display method, which is not repeated here.

The search result display method and apparatus, computer device and storage medium provided by the embodiments of the present disclosure, in response to a search request, a preview resource of a target video associated with search information in the search request can be obtained. The preview resource includes the video preview information of the target video, the first associated text extracted from the target video and related to the target video content, and the attribute type configured to indicate the first associated text. Therefore, in response to displaying the target video, the video preview information and the second associated text for display can be displayed, wherein the second associated text is determined for the first associated text by using the attribute type. In this way, after searching, the second associated text displayed on the video preview information can directly display the text information associated to the search information in the video to the user in response to displaying the video preview information, that is, it is more intuitive to display the content related to the search information in the video type search results, thereby improving the efficiency of acquiring the content related to the search information.

In order to make the above objects, features and advantages of the present disclosure more obvious and easier to understand, the following is a detailed description of preferred embodiments, together with the drawings.

BRIEF DESCRIPTION OF DRAWINGS

In order to explain the technical schemes of the embodiments of the present disclosure more clearly, the following will briefly introduce the drawings needed in the embodiments, which are incorporated into and constitute a part of this specification, these drawings show the embodiments in line with the present disclosure and together with the specification, serve to explain the technical schemes of the present disclosure. It should be understood that the following drawings only show some embodiments of the present disclosure, so they should not be regarded as limiting the scope, for ordinary people skilled in the field, other related drawings can be obtained according to these drawings without creative work.

FIG. 1 illustrates a flowchart of a search result display method provided by an embodiment of the present disclosure;

FIG. 2*a* illustrates a first schematic diagram of displaying video preview information and a second associated text of a target video as provided by an embodiment of the present disclosure;

FIG. 2*d* illustrates a fourth schematic diagram of displaying video preview information and a second associated text of a target video as provided by an embodiment of the present disclosure;

FIG. 3*a* illustrates a first schematic diagram of a full-screen playback page provided by an embodiment of the present disclosure;

DETAILED DESCRIPTION

Figure 2B:
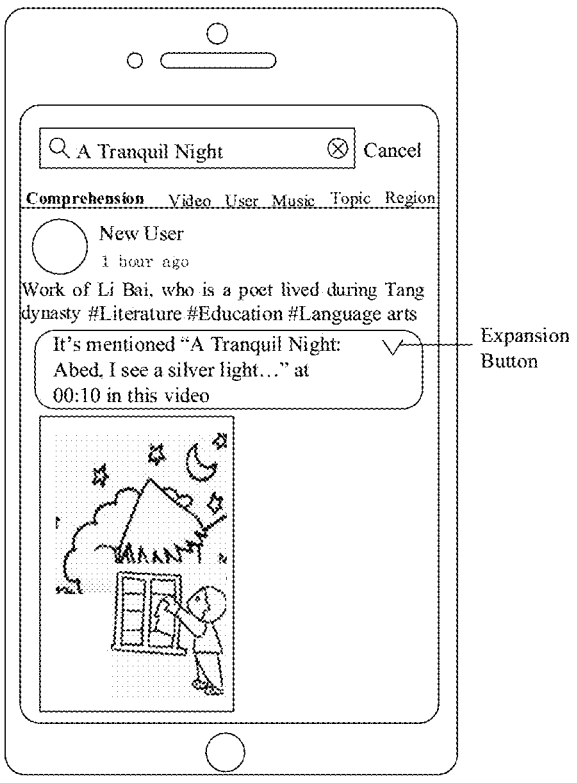
FIG. 2*b* illustrates a second schematic diagram of displaying video preview information and a second associated text of a target video as provided by an embodiment of the present disclosure.

In order to make the purposes, technical schemes and advantages of the embodiments of the present disclosure more clear, the technical schemes in the embodiments of the present disclosure will be described clearly and completely with the accompanying drawings, obviously, the described embodiments are only a part of the embodiments of the present disclosure, but not the all embodiments. Components of the embodiments of the present disclosure generally described and illustrated herein may be arranged and designed in various different configurations. Therefore, the following detailed description of the embodiments of the present disclosure is not intended to limit the scope of the disclosure claimed for protection, but merely represents selected embodiments of the present disclosure. Based on the embodiments of the present disclosure, all other embodiments obtained by those skilled in the field without creative work belong to the scope of protection of the present disclosure.

It is found through research that, in a scene of searching with search information, the searchable videos usually contain content information related to the search information. In response to displaying these videos, the exposed video introduction and the firstly displayed video frame usually do not contain complete content information, and these pieces of content information cannot be directly and completely displayed. Therefore, for such video type search results, it takes a longer content consumption time for the users to acquire the content information therefrom, which results in poor efficiency of acquiring the content information.

Based on the above research, the present disclosure provides a search result display method and apparatus, a computer device and a storage medium. In response to a search request, a preview resource of a target video associated with search information in the search request can be acquired. The preview resource includes video preview information of the target video, a first associated text extracted from the target video and related to the target video, and an attribute type for indicating the first associated text. Therefore, in response to displaying the target video, the video preview information and a second associated text for display can be displayed, wherein the second associated text is determined for the first associated text by using the attribute type. In this way, after searching, the second associated text displayed on the video preview information can directly display, to the user, the text information associated to the search information. That is to say, it is more intuitive to display the content related to the search information in the video type search results, thus improving the efficiency for the user to acquire the content related to the search information.

The shortcomings involved in the above-described scheme all belong to the results obtained by the inventor after practice and careful research. Therefore, the process of finding the above problems and the following schemes proposed by the present disclosure in view of the above problems all should be regarded as contributions to the present disclosure made by the inventor in the process of the present disclosure.

It should be noted that similar signs and letters indicate similar items in the following drawings, therefore, once an item is defined in one drawing, it's unnecessary for the item to be further defined and explained in subsequent drawings.

In order to facilitate the understanding of this embodiment, firstly, a search result display method disclosed in the embodiments of the present disclosure is introduced in detail. The execution subject of the search result display method provided in the embodiments of the present disclosure is generally a computer device with certain computing power. The computer device includes, for example, a terminal device or a server or other processing devices. The terminal device can be a user equipment (UE), a mobile device, a user terminal, a terminal, a cellular phone, a cordless phone, a personal digital assistant (PDA), a handheld device, a computing device, a vehicle-mounted device, a wearable device, etc. In some possible implementations, the search result display method can be realized by way of invoking, through a processer, computer-readable instructions stored in a memory.

Hereinafter, the search result display method provided by the embodiment of the present disclosure will be explained with reference to the case where the execution subject is a user terminal, by way of example.

Referring to FIG. 1, which is a flowchart of a search result display method provided by an embodiment of the present disclosure. The method includes steps of S101~S102.

S101: in response to a search request, acquiring a preview resource of a target video associated with search information in the search request; in which the preview resource includes a first associated text, an attribute type corresponding to the first associated text, and video preview information of the target video; the first associated text is extracted based on the target video;

S102, displaying the video preview information and a second associated text of the target video based on a search result display form corresponding to the attribute type; in which the second associated text at least includes a part of a content of the first associated text.

Hereinafter, S101~S102 will be described in detail.

For the above-mentioned S101, in response to performing searching by a user, the user terminal can send a search request by inputting search information in a search box and triggering a search operation button. The search request includes search information, and the search information includes search fields, question topics and the like input by the user. After the server receives the search request, it can determine a target video that matches the search information, from a plurality of available videos, according to the search information in the search request. Here, the target video matching the search information, specifically, includes a video screened from a plurality of videos and containing at least one of a video frame, a speech voice, a text content or the like which can be used as answer information of a question. In response to the search information is utilized to determine a target video from the plurality of videos, an online processing manner can be adopted.

For the target video, there is also a corresponding preview resource. The preview resource, specifically, is configured to preview and display the target video at the user terminal. The preview resource includes a first associated text extracted based on the target video. In particular practice, in response to extracting the first associated text from the target video, specifically, the target video can be processed by using methods such as optical character recognition (OCR) and automatic speech recognition (ASR). In response to processing the target video by way of OCR or ASR, the online processing manner can be adopted.

Here, after processing the target video by using methods such as OCR and ASR, etc., for example, a plurality of words or short sentences without punctuation marks are obtained. In order to enable the displayed, first associated text to have a complete sentence structure, punctuation marks would be added to the words or short sentences obtained after processing to form a sentence segment that can be directly displayed. Moreover, in order to enable the displayed content to be more logical, serial numbers, labels or the like can be used to mark the content in segments, or, highlights and underlines can be used to mark the key points in the content. In addition, there may be words or short sentences composed of symbols, letters and other substitutes in the identified content. In a possible way, ASR can be used to assist in restoring the semantics of these words or short sentences or correcting the misrecognition, to get the first associated text with clear and complete expression information.

Different first associated texts can be obtained according to different search information. For example, in response to the search information includes a search field input by a user, for example, a user name of a certain user, a name of a scenic spot, a poem, and other search words or search sentences without definite questions are input, that is, in response to the search information is of a non-question-and-answer search type, the acquired target video may include, for example, a video created by a user, a classic introductory video and an explanation video of a poem. Therefore, in this case, the first associated text in the preview resource of the target video can be summary information extracted from the target video, for example, an explanation text extracted from an explanation video of a poem. For example, a user searches by using "A Tranquil Night" as a search word, and acquires first associated text information including "A Tranquil Night: Abed, I see a silver light; I wonder if it's frost aground; looking up, I find the moon bright; bowing, in homesickness I'm drowned", for example.

In another possible case, in response to the search information including a question topic with a definite question, for example, a question "What is rectus abdominis" is input, that is, in response to the search information being of a question-and-answer search type, the acquired target video may include, for example, an answer video that gives a detailed answer to the question, or a video that is only related to some words in the search question. For the two cases described above, in response to the target video including the answer video, the first associated text in the corresponding preview resource may include answer information extracted from the answer video; in response to there being a non-answer video in the target video, the corresponding first associated text in the preview resource includes an explanation text extracted from the non-answer video, which is similar to the summary information extracted in the case where the search information is of a non-question-and-answer search type as described above.

Therefore, in the embodiment of the present disclosure, different attribute types are correspondingly determined for different types of first associated texts, so as to determine the second associated text for display according to the attribute type corresponding to the first associated text.

In particular implementation, the attribute type of the first associated text is determined according to the following ways: in response to the search information being of a non-question-and-answer search type, determining that the first associated text belongs to a summary attribute type; in response to the search information being of a question-and-answer search type, determining that the first associated text belongs to an answer attribute type in response to the first associated text containing answer information corresponding to the search information, and determining that the first associated text belongs to the summary attribute type in response to the first associated text not containing the answer information.

In this way, for the first associated text belonging to the summary attribute type, it can be directly displayed as a second associated text because it can directly reflect the specific content contained in the target video as information for user to preview. For the first associated text belonging to the answer attribute type, a second associated text for display can be further determined by determining an answer type of the first associated text, in order to enable the user to acquire the answer information more easily.

Further, for the case where the first associated text belongs to an answer attribute type, it also varies depending on the first associated text. Specifically, for an answer that is the only one answer or an answer that explains a certain concept, for example, for an answer to a question Q1: "What is rectus abdominis", the first associated text that can be acquired is relatively simple and short because it explains the concept, for example, the corresponding first associated text is A1: "Rectus abdominis refers to the two muscles that stand upright in front of our belly, commonly known as eight-pack abdominal muscles". However, for an answer that is one of a plurality of answers, or an answer that explains a question specifically including plenty of steps and descriptive information, for example, for an answer to a question Q2: "What's wrong with feeling like being punctured by a needle at the left side of the chest?", the first associated text that can be acquired is relatively longer, for example, the corresponding first associated text is A2: "Generally speaking, it's as uncomfortable as being punctured by a needle again and again, which is usually related to the influence of emotional and neurological functions, or to the inflammation of costal cartilage."

Therefore, for the case where the first associated text belongs to an answer attribute type, the first associated text can further involve different answer types, specifically including a first answer type and a second answer type, which can be used to determine a second associated text as displayed. In response to displaying the target video, in order to ensure that a normal and complete playback of the target video would not be destroyed, a display region of text is set, and this display region is limited. As a result, the first associated text may not be completely displayed; at this time, a corresponding second associated text can be determined according to the answer type of the first associated text, and the second associated text can be displayed.

In particular implementation, the answer type corresponding to the first associated text can be determined by the following ways: in response to the first associated text satisfying a classification condition of the first answer type, determining that the answer type corresponding to the first associated text is the first answer type; in response to the first associated text not satisfying the classification condition of the first answer type, determining that the answer type corresponding to the first associated text is the second answer type. The classification condition of the first answer type includes at least one of the following: a statistical word number of the first associated text being less than a preset answer word number threshold, a keyword associated with the search information in the first associated text being used as a leading word of the first associated text, and only one piece of answer information matching the search word being contained in the first associated text.

For example, the answer word number threshold can be determined according to the maximum number of words that can be presented in the region where the answer text is displayed, for example, 50 words.

The keywords associated with the search information in the first associated text may include, for example, some words in the question, such as "rectus abdominis" in question Q1; alternatively, the keywords may also include some words in the answer that directly answer the question, such as "influence on emotional and neurological functions" and "inflammation of costal cartilage" in the first associated text A2. Specifically, the keywords can be determined according to a semantic segmentation of the first associated text. A plurality of words with different semantic information can be obtained by a semantic segmentation processing on the first associated text. According to a comparison between the semantic information of each word and the search information, keywords associated with the search information can be determined from the plurality of words. In response to a keyword being used as a leading word in the first associated text, it can specifically include explaining the answer by starting with the keyword in the first associated text. For example, in the above-mentioned first associated text A1, the keywords "rectus abdominis" occupy the first few character positions in the first associated text A1.

For the first associated text, there may also be a plurality of pieces of answer information matching the search word. For example, for the first associated text A2, it specifically includes two pieces of answer information, namely, "influence on emotional and neurological functions" and "inflammation of costal cartilage".

In response to displaying an answer text, on the one hand, the number of words that can be displayed is limited, and on the other hand, it is more desirable to display the answer information corresponding to the question intuitively and concisely so that users can obtain the answer more easily by viewing the answer text. After determining the answer type of the first associated text according to at least one of the above ways, it can be appreciated that the first associated text of the first answer type is more in conformity with the display requirements and user demands and hence is more suitable for direct display. As a comparison, in the first associated text of the second answer type, the keywords directly associated with the answer to the question are relatively scattered, and the length of the second associated text is generally longer, so it cannot be completely displayed in a limited region and usually takes a longer time for users to finally get the complete answer, which is not suitable for direct display.

Here, in the embodiment of the present disclosure, for the first associated text of the second answer type, a second associated text that is easy to display can be reconstructed according to the keywords in the first associated text, and then the second associated text can be displayed. For details, reference can be made to the following descriptions of the corresponding positions, which are not repeated here.

The preview resource also includes video preview information of the target video, which can be used as cover information for display in response to the target video being displayed, for example. Specifically, a first video frame of the target video can be used as the video preview information, or any one of a plurality of video frames included in the target video can be used as the video preview information according to the actual demands, which can be determined according to the actual situation and is not limited here.

In this way, after the user terminal acquires the preview resource of the target video, the video preview information of the target video in the preview resource and the second associated text determined for the first associated text according to the attribute type can be displayed.

In the above-mentioned S102, the video preview information of the target video can be displayed, and the video preview information can be acquired according to the corresponding way described in S101. According to the explanation in the above-mentioned S101, in response to determining the displayed second associated text by utilizing the attribute type of the first associated text, it can be specifically determined by the following ways: in response to the first associated text belongs to a summary attribute type, taking the first associated text as the second associated text; in response to the first associated text belonging to an answer attribute type, determining the second associated text corresponding to the first associated text based on the answer type of the first associated text.

In response to the first associated text being of an answer attribute type, specifically, in response to the answer type corresponding to the first associated text being a first answer type, taking the first associated text as the second associated text; in response to the answer type corresponding to the first associated text being a second answer type, selecting keywords matching the search information from the first associated text, and generating the second associated text based on the keywords.

According to the above explanation of determining the answer type, it can be appreciated that the first associated text of the first answer type is suitable to be directly displayed; therefore, in the case that the answer type corresponding to the first associated text is the first answer type, the first associated text can be directly used as the second associated text. The first associated text of the second answer type is generally longer, and the user cannot directly acquire the answer information in response to such first associated text being directly displayed; thus, a second associated text that briefly and directly expresses the answer information can be acquired accordingly, and the second associated text can be displayed.

In a particular implementation, in response to determining the second associated text based on the keywords, the following way can be adopted: splicing a plurality of selected keywords based on a semantic order of the plurality of selected keywords in the first associated text to obtain the second associated text. Specifically, the semantic order of the keywords in the first associated text can be determined according to the sequence in which the keywords appear in the first associated text. For example, for the first associated text A2, in response to it being determined that the first associated text belongs to the second answer type and the keywords are "influence of emotional and neurological functions" and "inflammation of costal cartilage", because the keywords "influence of emotional and neurological functions" appear preceding the keywords "inflammation of costal cartilage" in the first associated text, the second associated text can be obtained as "influence of emotional and neurological functions, inflammation of costal cartilage" by splicing the keywords.

In another possible case, the first associated text of the second answer type may specifically include a plurality of steps. For example, for a question Q3: "How to make carrot and potato cakes", the corresponding first associated text is A3: "Prepare 150 g of shredded potatoes and 150 g of shredded carrots firstly, parboil and take them out. Then put the shredded potatoes and carrots, with water removed, into a bowl, and add 2 eggs, an appropriate amount of chopped green onions, a little soy sauce, a little salt and 20 g of starch into the bowl. Finally, stir them evenly, put them into a frying pan brushed with oil in the shape of cakes, and fry them over low heat until both sides of the cakes are golden and cooked.". The first associated text includes a plurality of continuous steps, so in response to the keywords therein being spliced, the semantic order of the plurality of keywords is determined according to the sequence of these steps, and the second associated text is obtained as, for example, "Parboil 150 g of shredded potatoes and 150 g of shredded carrots, and then take them out with water removed; add 2 eggs, an appropriate amount of chopped green onions, a little soy sauce, a little salt and 20 g of starch; stir them evenly, put them into a frying pan brushed with oil in the shapes of cake, and fry them over low heat until both sides of the cake are golden and cooked.".

In response to the second associated text being determined, the video preview information and the second associated text of the target video can be displayed.

In a particular implementation, in response to displaying the video preview information and the second associated text of the target video based on the search result display form corresponding to the answer type, the following ways can be adopted: in response to the attribute type being the first answer type under the answer attribute type, displaying the second associated text on the video preview information; in response to the attribute type being the summary attribute type or the second answer type under the answer attribute type, displaying the second associated text in a location region adjacent to the video preview information.

For example, in response to the attribute type being the first answer type under the answer attribute type, reference can be made to FIG. 2a, which is a first schematic diagram of displaying the video preview information and the second associated text of the target video as provided by the embodiment of the present disclosure. The first associated text is A1, and the second associated text is correspondingly determined as the first associated text, specifically including "Rectus abdominis refers to the two muscles that stand upright in front of our belly, commonly known as eight-pack abdominal muscles". The video preview information is a first video frame of the target video, for example, the muscle distribution map of human body as illustrated.

In response to the attribute type being a summary attribute type, reference can be made to FIG. 2b, which is a second schematic diagram of displaying the video preview information and the second associated text of the target video as provided by the embodiment of the present disclosure. In response to displaying the video preview information and the second associated text, they can be specifically displayed on a video outflow page. The video outflow page is a search result page that displays a video in a non-full screen. Specifically, a plurality of videos displayed in a form of small windows can be displayed sequentially by operations of sliding up and down. The first associated text is, for example, "A Tranquil Night: Abed, I see a silver light; I wonder if it's frost aground; looking up, I find the moon bright; bowing, in homesickness I'm drowned" as explained in the example above; correspondingly, the second associated text is determined as the first associated text according to the attribute type. The video preview information is any video frame of the target video, for example, a picture illustrating the poem.

In a possible case, because the region where the text is displayed is limited, the first associated text with a huge statistic number of words may not be completely displayed. For example, only a part of the information of the second associated text is displayed in FIG. 2b.

In another possible case, for the second associated text shown in FIG. 2b, the second associated text may further be updated to the first associated text in response to a display triggering operation on the second associated text, and then the content of the first associated text is displayed. For details, reference can be made to the following related descriptions of FIG. 2c and FIG. 2d, which will not be repeated here.

Figure 2C:
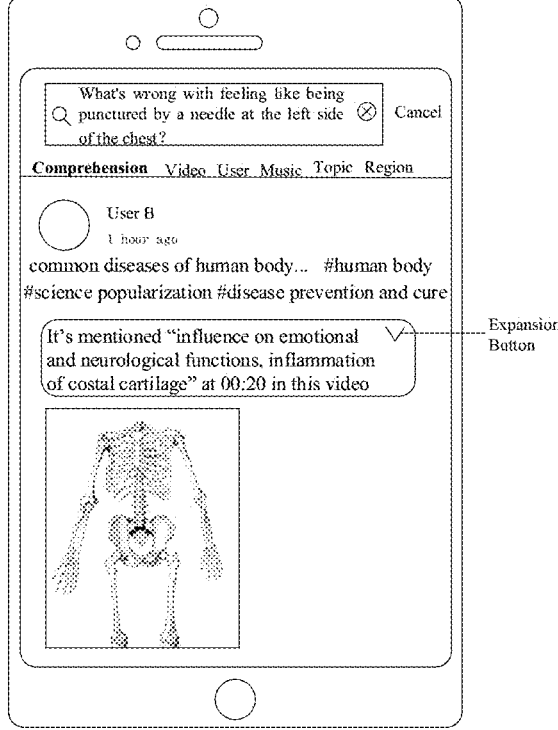
FIG. 2*c* illustrates a third schematic diagram of displaying video preview information and a second associated text of a target video as provided by an embodiment of the present disclosure.

In response to the attribute type being the second answer type under the answer attribute type, reference can be made to FIG. 2c, which is a third schematic diagram of displaying the video preview information and the second associated text of the target video as provided by the embodiment of the present disclosure. Similarly, they are displayed on the video outflow page. The first associated text is A2: "Generally speaking, it's as uncomfortable as being punctured by a needle again and again, which is usually related to the influence of emotional and neurological functions, or to the inflammation of costal cartilage", and the second associated text determined through the first associated text is: "influence of emotional and neurological functions, inflammation of costal cartilage", which is specifically shown in FIG. 2c.

In a possible case, for the second associated text shown in FIG. 2c, similarly to the above-mentioned FIG. 2b, the second associated text may further be updated to the first associated text in response to a display triggering operation on the second associated text, and then the content of the first associated text can be displayed.

For example, reference can be made to FIG. 2d, which is a fourth schematic diagram of displaying the video preview information and the second associated text of the target video as provided by the embodiment of the present disclosure. In a possible case, the second associated text can be updated to the first associated text by triggering an expansion button in FIG. 2c, and the content of the first associated text can be completely displayed. Accordingly, a retraction button is appeared at the original position of the expansion button, and the page in FIG. 2c can be returned in response to triggering the retraction button.

In another embodiment of the present disclosure, it may include: displaying a full-screen playback page of a content corresponding to the video preview information in response to a display triggering operation on the video preview information; displaying the second associated text in a form of a floating layer on the full-screen playback page; and in response to the attribute type being the second answer type under the answer attribute type, updating the second associated text to the first associated text in response to triggering the second associated text.

The full-screen playback page is a video inflow page different from any of the pages in FIGS. 2a-2d, and the target video is played in the form of full-screen playing, i.e., it is a display page of the target video. With respect to the triggering operation on the video preview information in the above-mentioned FIGS. 2a-2d, it allows jumping to the full-screen playback page which displays the content corresponding to the video preview information.

For example, for the video preview information shown in FIG. 2a, after triggering the video preview information, a full-screen playback page is displayed, for example, as shown in FIG. 3a. In FIG. 3a, a second associated text as same as that in FIG. 2a is displayed in the form of a floating layer. Such display mode in the form of a floating layer or in the form of displaying the second associated text with a certain transparency would not cause considerable obstruction to the playback of the target video, so it will not affect the inherent playback form of the target video or destroy the original video content; and at the same time, it can directly display the answer information to the user.

Figure 3B:
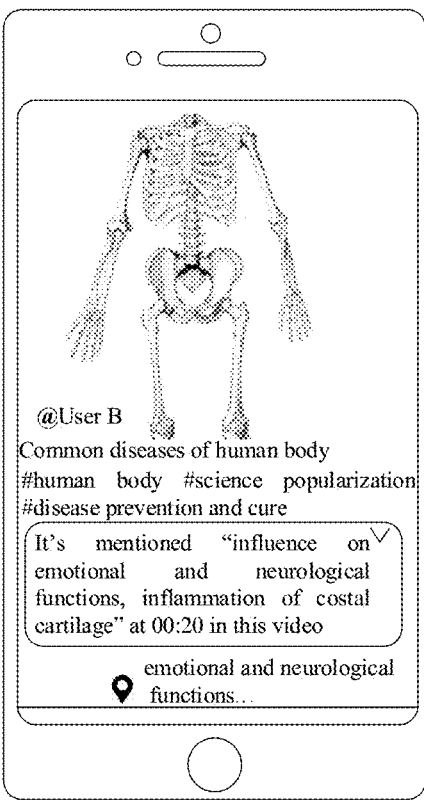
FIG. 3*b* illustrates a second schematic diagram of a full-screen playback page provided by an embodiment of the present disclosure.
Figure 3C:
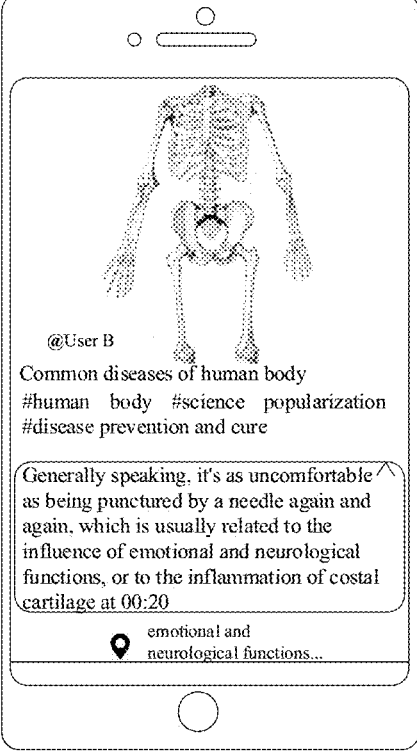
FIG. 3*c* illustrates a third schematic diagram of a full-screen playback page provided by an embodiment of the present disclosure.

Accordingly, for the video preview information shown in FIG. 2b and FIG. 2c, after triggering the video preview information, a full-screen playback page can also be displayed accordingly. The triggering of the video preview information shown in FIG. 2c will be described below by way of example. For the video preview information shown in FIG. 2c, after triggering the video preview information, the full-screen playback page as displayed is shown in, for example, FIG. 3b. In FIG. 3b, there is also an expansion button similar to that in FIG. 2c. Because the answer attribute type is the second answer type, the displayed, second associated text is not the complete first associated text; thus, the second associated text can be updated to the first associated text in response to triggering the second associated text, and then the first associated text can be displayed. For example, as shown in FIG. 3c, correspondingly to the above-mentioned FIG. 2d, after triggering the second associated text, the complete first associated text can be displayed in the form of a floating layer. Accordingly, the expansion button is transformed into the retraction button.

In another embodiment of the present disclosure, the displayed, second associated text is determined according to the first associated text, and the first associated text is extracted from the target video. Therefore, in the target video, there is at least one position involving the second associated text. In order to facilitate the user to directly locate the position where the second associated text is displayed in the target video, at least one indication tag associated with the video preview information can further be determined in response to determining the video preview information. Each indication tag is used to indicate a corresponding playback position, in the target video, of at least part of text information of the second associated text.

"At least part of text information" described here includes, for example, keywords constituting the second associated text. In a possible case, the keywords of the second associated text appear in different positions in the video, and some of these keywords are concentrated and continuous. In this case, a corresponding indication tag can be determined for a plurality of continuous and concentrated keywords, for example, a corresponding position in the target video can be determined for a first keyword among the plurality of keywords appearing concentratedly and continuously, so as to determine an indication position of the indication tag corresponding to these keywords. In this way, the total number of indication tags associated in the target video can be controlled; and in the subsequent operation steps, all the answer information involved to the second associated text can be viewed in the target video by triggering a small number of indication tags.

In response to displaying the video preview information of the target video, it may specifically include: determining a display position corresponding to each of the at least one indication tag according to at least one playback position in the target video corresponding to the second associated text; displaying the video preview information, and displaying the at least one indication tag on the video preview information based on the display position determined for each of the at least one indication tag.

In response to displaying the at least one indication tag in the target video, it may specifically include the following two situations: displaying on a playback progress bar of the target video, and/or displaying in the second associated text. These two situations will be explained in the following, respectively.

For the case where at least one indication tag is displayed on the playback progress bar of the target video, the display position of the at least one indication tag can be determined from progress positions indicated by the playback progress bar of the target video according to at least one playback position corresponding to the second associated text in the target video.

Referring to FIG. 3a, an indication tag is specifically displayed in the progress bar shown in the lower part. The playback position indicated by the indication tag is the playback position of the second associated text in the target video. In a possible case, in response to there being only one indication tag, it can be displayed directly. In response to there being more than one indication tag, some characters of the second associated text that are played at an indication tag can also be marked in the vicinity of the corresponding indication tag in order to distinguish different indication tags on the progress bar. For details, reference can be made to the display forms of the indication tags in FIGS. 3b and 3c.

For the video preview information shown in FIGS. 2a-2c, in the case that the corresponding playback progress bar can be displayed in response to the target video being played, the indication tag can also be displayed in a similar way, and the details will not be repeated.

For the case where at least one indication tag is displayed in the second associated text, the display position of the indication tag can be determined, according to the text information corresponding to each playback position of the at least one playback position, at the display position of the second associated text.

In a possible case, the indication tag described here may not be used as a positioning mark shown in FIG. 3a, but may be displayed as a button that can be triggered, specifically illustrating the time information corresponding to the playback position.

For example, as shown in FIG. 2a, in response to displaying second associated text information, the indication tag can be displayed in the form of prompt information, for example, "It is mentioned in this video at 00:35" is displayed. Alternatively, the indication tag can also be incorporated in the second associated text information for display, for example, an indication tag "00:20" is displayed in the second associated text information shown in FIG. 2d. In response to there being a plurality of indication tags, the way of displaying the indication tags in the second associated text information is more intuitive than displaying a plurality of pieces of time information by using prompt information.

For the displayed, indication tag, it can not only intuitively express the corresponding playback position of at least part of text information of the second associated text information, but can also be used as a triggerable button. In a possible case, it may include: determining a playback position indicated by any indication tag as an initial playback position of the target video in response to a triggering operation for the any indication tag; and playing the target video from the initial playback position.

Figure 4:
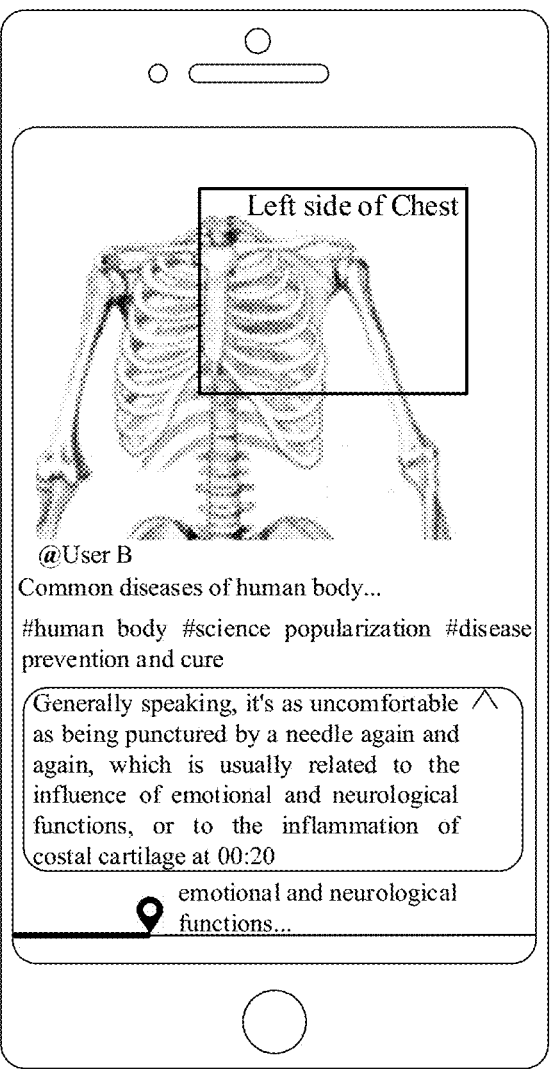
FIG. 4 illustrates a schematic diagram of jumping to play a target video provided by an embodiment of the present disclosure.

For example, for the two different indication tags shown in FIG. 3c, in response to a triggering of any one of the indication tags, it will be jumped from the initial playback position of the target video to the playback position indicated by the indication tag, such as the playback position of 00:20. For example, referring to FIG. 4, which is a schematic diagram of jumping to play a target video provided by an embodiment of the present disclosure. Compared with FIG. 3c, the playback progress bar indicates that the playback position indicated by the indication tag is currently being played. In addition, the target video is played from the initial playback position.

In this way, through the indication tag, the second associated text information contained in the target video can be directly displayed by jumping without the need of waiting for the target video to be played to the position corresponding to the second associated text information, which is simpler and faster.

It can be understood by those skilled in the field that in the above-described method of specific embodiments, the writing order of various steps does not mean strict execution order or constitute any limitation on the implementation process, and the specific execution order of various steps should be determined according to their functions and possible internal logics.

Based on the same inventive concept, an embodiment of the present disclosure further provides a search result display apparatus corresponding to the search result display method. Because the principle of solving problems by the apparatus in the embodiment of the present disclosure is similar to that of the above-described search result display method in the embodiment of the present disclosure, the implementation of the apparatus can refer to the implementation of the method and will not be repeated here.

Figure 5:
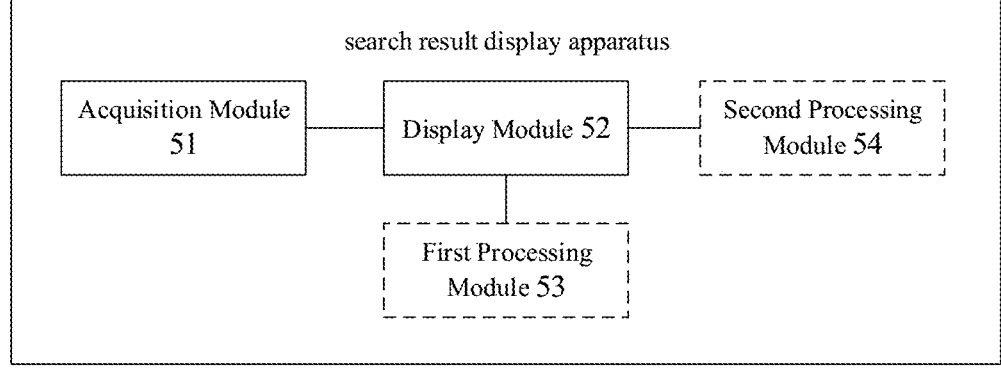
FIG. 5 illustrates a schematic diagram of a search result display apparatus provided by an embodiment of the present disclosure.

Referring to FIG. 5, which is a schematic diagram of a search result display apparatus provided by an embodiment of the present disclosure. The apparatus includes an acquisition module 51 and a display module 52.

The acquisition module 51 is configured to acquire a preview resource of a target video associated with search information in a search request in response to the search request; wherein the preview resource includes a first associated text, an attribute type corresponding to the first associated text, and video preview information of the target video; the first associated text is extracted based on the target video.

The display module 52 is configured to display the video preview information and a second associated text of the target video based on a search result display form corresponding to the attribute type; wherein the second associated text at least includes a part of a content of the first associated text.

In an alternative implementation, the attribute type of the first associated text is determined according to the following ways: in response to the search information being of a non-question-and-answer search type, determining that the first associated text belongs to a summary attribute type; in response to the search information being of a question-and-answer search type, determining that the first associated text belongs to an answer attribute type in response to the first associated text containing answer information corresponding to the search information, and determining that the first associated text belongs to the summary attribute type in response to the first associated text not containing the answer information. The second associated text is determined according to the following ways: in response to the first associated text belonging to the summary attribute type, taking the first associated text as the second associated text; in response to the first associated text belonging to the answer attribute type, determining the second associated text corresponding to the first associated text based on an answer type of the first associated text.

In an alternative implementation, in response to the first associated text belonging to the answer attribute type, the answer type of the first associated text includes a first answer type and a second answer type; and the second associated text is determined according to the following ways: in response to the answer type corresponding to the first associated text being the first answer type, taking the first associated text as the second associated text; in response to the answer type corresponding to the first associated text being the second answer type, selecting keywords matching the search information from the first associated text, and generating the second associated text based on the keywords.

In an alternative implementation, in response to the first associated text belonging to the answer attribute type, the answer type corresponding to the first associated text is determined by the following ways: in response to the first associated text satisfying a classification condition of the first answer type, determining that the answer type corresponding to the first associated text is the first answer type; in response to the first associated text not satisfying the classification condition of the first answer type, determining that the answer type corresponding to the first associated text is the second answer type. The classification condition of the first answer type includes at least one of the following: a statistical word number of the first associated text is less than a preset answer word number threshold, a keyword associated with the search information in the first associated text being used as a leading word of the first associated text, and only one piece of answer information matching the search word being contained in the first associated text.

In an alternative implementation, in response to displaying the video preview information and the second associated text of the target video based on the search result display form corresponding to the answer type, the display module 52 is configured to: display the second associated text on the video preview information in response to the attribute type being the first answer type under the answer attribute type; display the second associated text in a location region adjacent to the video preview information in response to the attribute type being the summary attribute type or the second answer type under the answer attribute type.

In an alternative implementation, the search result display apparatus further includes a first processing module 53 configured to: display a full-screen playback page of a content corresponding to the video preview information in response to a display triggering operation on the video preview information; display the second associated text in the form of a floating layer on the full-screen playback page; and in response to the answer type being the second answer type, update the second associated text to the first associated text in response to triggering the second associated text.

In an alternative implementation, the search result display apparatus further includes a second processing module 54 configured to: update the second associated text to the first associated text in response to a display triggering operation on the second associated text.

In an alternative implementation, in response to determining the second associated text based on the keywords, it may include: splicing a plurality of selected keywords based on a semantic order of the plurality of selected keywords in the first associated text to obtain the second associated text.

In an alternative implementation, the video preview information is associated with at least one indication tag; each indication tag is configured to indicate a corresponding playback position of at least part of text information of the second associated text in the target video. In response to displaying the video preview information of the target video, the display module 52 is configured to: determine a display position corresponding to each of the at least one indication tag according to at least one playback position in the target video corresponding to the second associated text; display the video preview information, and display the at least one indication tag on the video preview information based on the display position determined for each of the at least one indication tag.

In an alternative implementation, in response to determining the display position corresponding to each of the at least one indication tag according to the at least one playback position in the target video corresponding to the second associated text, the display module 52 is configured to: determine the display position of the at least one indication tag from progress positions indicated by a playback progress bar of the target video according to the at least one playback position in the target video corresponding to the second associated text; and/or determine the display position of the indication tag according to a display position of text information, in the second associated text, corresponding to each of the at least one playback position.

In an alternative implementation, the display module 52 is further configured to: in response to a triggering operation for any indication tag, determine the playback position indicated by the indication tag as an initial playback position of the target video; and play the target video from the initial playback position.

For the description of the processing flow of each module in the apparatus and the interaction flow between various modules, reference can be made to the relevant description in the above method embodiments, and will not be described in detail here.

Figure 6:
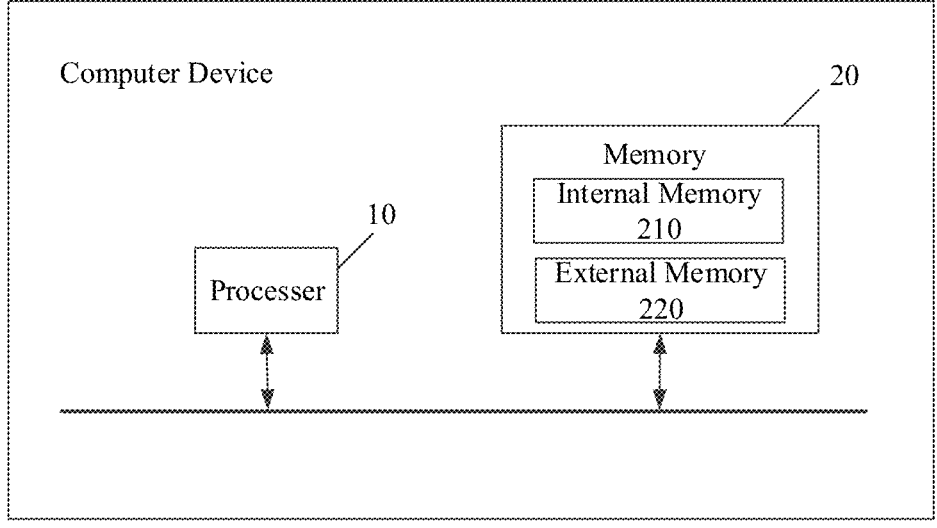
FIG. 6 illustrates a schematic diagram of a computer device provided by an embodiment of the present disclosure.

An embodiment of the present disclosure further provides a computer device, as shown in FIG. 6, which is a schematic structural diagram of the computer device provided by the embodiment of the present disclosure. The computer device includes:

a processor 10 and a memory 20; the memory 20 stores machine-readable instructions executable by the processor 10, and the processer 10 is configured to execute the machine-readable instructions stored in the memory 20. In response to the machine-readable instructions are executed by the processor 10, the processor 10 performs the following steps:

in response to a search request, acquiring a preview resource of a target video associated with search information in the search request, wherein the preview resource includes a first associated text, an attribute type corresponding to the first associated text, and video preview information of the target video, and wherein the first associated text is extracted based on the target video; and displaying the video preview information and a second associated text of the target video based on a search result display form corresponding to the attribute type, wherein the second associated text at least includes a part of a content of the first associated text.

The memory 20 includes an internal memory 210 and an external memory 220.

The internal memory 210 here is also referred to as internal storage, which is configured to temporarily store operation data in the processor 10 and the data exchanged with the external memory 220 such as a hard disk. The processor 10 exchanges data with the external memory 220 through the internal memory 210.

For the specific execution process of the above-mentioned instructions, reference can be made to the steps of the search result display method described in the embodiments of the present disclosure, and will not be repeated here.

An embodiment of the present disclosure further provides a computer-readable storage medium, on which a computer program is stored, and the computer program, when executed by a processor, is configured to perform the steps of the search result display method described in the above method embodiments. The storage medium can be a volatile or non-volatile computer-readable storage medium.

An embodiment of the present disclosure further provides a computer program product carrying a program code, and the program code includes instructions configured to execute the steps of the search result display method described in the above method embodiments. For details, reference can be made to the above method embodiments, which are not repeated here.

The above computer program product can be realized by means of hardware, software or combination thereof. In an alternative embodiment, the computer program product is embodied as a computer storage medium; and in another alternative embodiment, the computer program product is embodied as a software product, e.g., a software development kit (SDK) and the like.

It can be clearly understood by those skilled in the field that for the convenience and conciseness of description, the specific working process of the system and apparatus described above can refer to the corresponding process in the aforementioned method embodiments, and will not be repeated here. In several embodiments provided by the present disclosure, it should be understood that the disclosed systems, apparatuses and methods can be realized in other ways. The apparatus embodiments described above are only schematic. For example, the division of the units is only a logical function division, and there may be another division method in actual implementations. For example, multiple units or components may be combined or integrated into another system, or some features may be ignored or not implemented. On the other hand, the mutual coupling or direct coupling or communication connection shown or discussed can be indirect coupling or communication connection through some communication interfaces, devices or units, which can be in electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of this embodiment.

In addition, each functional unit in each embodiment of the present disclosure may be integrated into one processing unit, or each unit may exist physically alone, or two or more units may be integrated into one unit.

In response to the functions are realized in the form of software functional units and sold or used as independent products, they can be stored in a processor-executable nonvolatile computer-readable storage medium. Based on this understanding, the technical scheme or a part of the technical scheme of the present disclosure can be embodied in the form of a software product, which is stored in a storage medium and includes several instructions to make a computer device (which can be a personal computer, a server, a network device, etc.) execute all or part of the steps of the method described in various embodiments of the present disclosure. The aforementioned storage media include: a U disk, a mobile hard disk, a Read-Only Memory (ROM), a random access memory (RAM), a magnetic disk or an optical disk or other media that can store program codes.

Finally, it should be explained that the above-mentioned embodiments are only specific implementations of the present disclosure, which are used to illustrate the technical schemes of the present disclosure, but not to limit them. The protection scope of the present disclosure is not limited to this. Although the present disclosure has been described in detail with reference to the above-mentioned embodiments, it should be understood by ordinary people skilled in the field that: within the technical scope of the present disclosure, any technical person familiar with the technical field can still modify or easily think of changes to, the technical scheme described in the aforementioned embodiments, or perform equivalent replacement of some of the technical features of the technical scheme. However, these modifications, changes or replacements do not make the essence of the corresponding technical scheme deviate from the spirit and scope of the technical scheme of the embodiment of present disclosure, and should be included in the protection scope of the present disclosure. Therefore, the scope of protection of the present disclosure should be based on the scope of protection of the claims.

The invention claimed is:

1. A search result display method, comprising:
   in response to a search request, acquiring a preview resource of a first video associated with search information in the search request; wherein the preview resource comprises a first associated text, an attribute type corresponding to the first associated text, and video preview information of the first video; the first associated text is extracted from the first video using optical character recognition or automatic speech recognition (ASR), and is further refined by ASR-assisted semantic restoration or misrecognition correction in response to identifying a word or a short sentence comprising a substitute term;

displaying the video preview information and a second associated text of the first video based on a search result display form corresponding to the attribute type; wherein the second associated text at least comprises a part of a content of the first associated text; and in response to triggering a control corresponding to the second associated text, updating the second associated text in a display page to the first associated text, wherein in response to the first associated text belonging to the answer attribute type, the answer type of the first associated text comprises a first answer type and a second answer type;

the second associated text is determined by:

in response to the answer type of the first associated text being the first answer type, taking the first associated text as the second associated text;

in response to the answer type of the first associated text being the second answer type, selecting a keyword matching the search information from the first associated text, and generating the second associated text based on the keyword, wherein the keywords are determined by performing a semantic segmentation of the first associated text and comparing a segmentation result with the search information.

2. The method according to claim 1, wherein the attribute type of the first associated text is determined by:

in response to the search information being of a non-question-and-answer search type, determining that the attribute type of the first associated text being a summary attribute type; and in response to the search information being of a question-and-answer search type, determining that the attribute type of the first associated text being an answer attribute type in response to the first associated text containing answer information corresponding to the search information, and determining that the attribute type of the first associated text being the summary attribute type in response to the first associated text not containing the answer information corresponding to the search information, wherein the second associated text is determined by:

in response to the first associated text belonging to the summary attribute type, taking the first associated text as the second associated text; and in response to the first associated text belonging to the answer attribute type, determining the second associated text corresponding to the first associated text based on an answer type of the first associated text.

3. The method according to claim 1, wherein in response to the first associated text belonging to the answer attribute type, the answer type of the first associated text is determined by:

determining that the answer type of the first associated text is the first answer type in response to the first associated text satisfying a classification condition of the first answer type, and determining that the answer type of the first associated text is the second answer type in response to the first associated text not satisfying the classification condition of the first answer type;

the classification condition of the first answer type comprises at least one of: a statistical word number of the first associated text being less than a preset answer word number threshold, the keyword associated with the search information in the first associated text being used as a leading word of the first associated text, and only one piece of answer information matching a search term being contained in the first associated text.

4. The method according to claim 1, wherein displaying the video preview information and the second associated text of the first video based on the search result display form corresponding to the attribute type, comprises:

in response to the attribute type being a first answer type under an answer attribute type, displaying the second associated text on the video preview information;

in response to the attribute type being a summary attribute type or a second answer type under the answer attribute type, displaying the second associated text in a location region adjacent to the video preview information.

5. The method according to claim 2, further comprising:

in response to a display triggering operation on the video preview information, displaying a full-screen playback page of a content corresponding to the video preview information;

displaying the second associated text, in a form of a floating layer, on the full-screen playback page; and in response to the attribute type being a second answer type under the answer attribute type, updating the second associated text to the first associated text in response to triggering a control corresponding to the second associated text.

6. The method according to claim 1, wherein generating the second associated text based on the keyword, comprises:

splicing a plurality of selected keywords based on a semantic order of the plurality of selected keywords in the first associated text to obtain the second associated text.

7. The method according to claim 1, wherein the video preview information is associated with at least one indication tag; each of the at least one indication tag is configured to indicate a corresponding playback position, in the first video, of at least part of text information of the second associated text;

displaying the video preview information of the first video, comprises:

determining a display position corresponding to each of the at least one indication tag according to at least one playback position, in the first video, corresponding to the second associated text;

displaying the video preview information, and displaying the at least one indication tag on the video preview information based on the display position determined for each of the at least one indication tag.

8. The method according to claim 7, wherein determining the display position corresponding to each of the at least one indication tag according to at least one playback position, in the first video, corresponding to the second associated text, comprises:

determining the display position of the at least one indication tag from progress positions indicated by a playback progress bar of the first video according to the at least one playback position, in the first video, corresponding to the second associated text; and/or, determining the display position of the indication tag at the display position in the second associated text, according to text information corresponding to each of the at least one playback position.

9. The method according to claim 7, further comprising:

in response to a triggering operation for any of the at least one indication tag, determining the playback position indicated by the indication tag as an initial playback position of the first video; and playing the first video from the initial playback position.

10. A computer device, comprising a processor and a memory, wherein the memory stores machine-readable instructions executable by the processor, and the processor is configured to execute the machine-readable instructions stored in the memory, and in response to the machine-readable instructions being executed by the processor, the processor performs:

in response to a search request, acquiring a preview resource of a first video associated with search information in the search request; wherein the preview resource comprises a first associated text, an attribute type corresponding to the first associated text, and video preview information of the first video; the first associated text is extracted from the first video using optical character recognition or automatic speech recognition (ASR), and is further refined by ASR-assisted semantic restoration or misrecognition correction in response to identifying a word or a short sentence comprising a substitute term;

displaying the video preview information and a second associated text of the first video based on a search result display form corresponding to the attribute type; wherein the second associated text at least comprises a part of a content of the first associated text; and in response to triggering a control corresponding to the second associated text, updating the second associated text in a display page to the first associated text, wherein in response to the first associated text belonging to the answer attribute type, the answer type of the first associated text comprises a first answer type and a second answer type;

the second associated text is determined by:

in response to the answer type of the first associated text being the first answer type, taking the first associated text as the second associated text;

in response to the answer type of the first associated text being the second answer type, selecting a keyword matching the search information from the first associated text, and generating the second associated text based on the keyword, wherein the keywords are determined by performing a semantic segmentation of the first associated text and comparing a segmentation result with the search information.

11. A non-transitory computer-readable storage medium, on which a computer program is stored, wherein in response to the computer program being executed by a computer device, the computer device performs:

in response to a search request, acquiring a preview resource of a first video associated with search information in the search request; wherein the preview resource comprises a first associated text, an attribute type corresponding to the first associated text, and video preview information of the first video; the first associated text is extracted from the first video using optical character recognition or automatic speech recognition (ASR), and is further refined by ASR-assisted semantic restoration or misrecognition correction in response to identifying a word or a short sentence comprising a substitute term;

displaying the video preview information and a second associated text of the first video based on a search result display form corresponding to the attribute type; wherein the second associated text at least comprises a part of a content of the first associated text; and in response to triggering a control corresponding to the second associated text, updating the second associated text in a display page to the first associated text, wherein in response to the first associated text belonging to the answer attribute type, the answer type of the first associated text comprises a first answer type and a second answer type;

the second associated text is determined by:

in response to the answer type of the first associated text being the first answer type, taking the first associated text as the second associated text;

in response to the answer type of the first associated text being the second answer type, selecting a keyword matching the search information from the first associated text, and generating the second associated text based on the keyword, wherein the keywords are determined by performing a semantic segmentation of the first associated text and comparing a segmentation result with the search information.

12. The computer device according to claim 10, wherein in response to the computer program being executed by a computer device, the computer device further performs:

in response to the search information being of a non-question-and-answer search type, determining that the attribute type of the first associated text being a summary attribute type;

in response to the search information being of a question-and-answer search type, determining that the attribute type of the first associated text being an answer attribute type in response to the first associated text containing answer information corresponding to the search information, and determining that the attribute type of the first associated text being the summary attribute type in response to the first associated text not containing the answer information corresponding to the search information;

in response to the first associated text belonging to the summary attribute type, taking the first associated text as the second associated text; and in response to the first associated text belonging to the answer attribute type, determining the second associated text corresponding to the first associated text based on an answer type of the first associated text.

13. The computer device according to claim 10, wherein in response to the first associated text belonging to the answer attribute type, in response to the computer program being executed by a computer device, the computer device further performs:

determining that the answer type of the first associated text is the first answer type in response to the first associated text satisfying a classification condition of the first answer type, and determining that the answer type of the first associated text is the second answer type in response to the first associated text not satisfying the classification condition of the first answer type;

wherein the classification condition of the first answer type comprises at least one of: a statistical word number of the first associated text being less than a preset answer word number threshold, the keyword associated with the search information in the first associated text being used as a leading word of the first associated text, and only one piece of answer information matching a search term being contained in the first associated text.

14. The computer device according to claim 10, wherein in response to the computer program being executed by a computer device, the computer device further performs:

in response to the attribute type being a first answer type under an answer attribute type, displaying the second associated text on the video preview information;

in response to the attribute type being a summary attribute type or a second answer type under the answer attribute type, displaying the second associated text in a location region adjacent to the video preview information.

15. The computer device according to claim 12, wherein in response to the computer program being executed by a computer device, the computer device further performs:

in response to a display triggering operation on the video preview information, displaying a full-screen playback page of a content corresponding to the video preview information;

displaying the second associated text, in a form of a floating layer, on the full-screen playback page; and in response to the attribute type being a second answer type under the answer attribute type, updating the second associated text to the first associated text in response to triggering a control corresponding to the second associated text.

16. The computer device according to claim 10, wherein in response to the computer program being executed by a computer device, the computer device further performs:

splicing a plurality of selected keywords based on a semantic order of the plurality of selected keywords in the first associated text to obtain the second associated text.

* * * * *